Patented Aug. 1, 1950

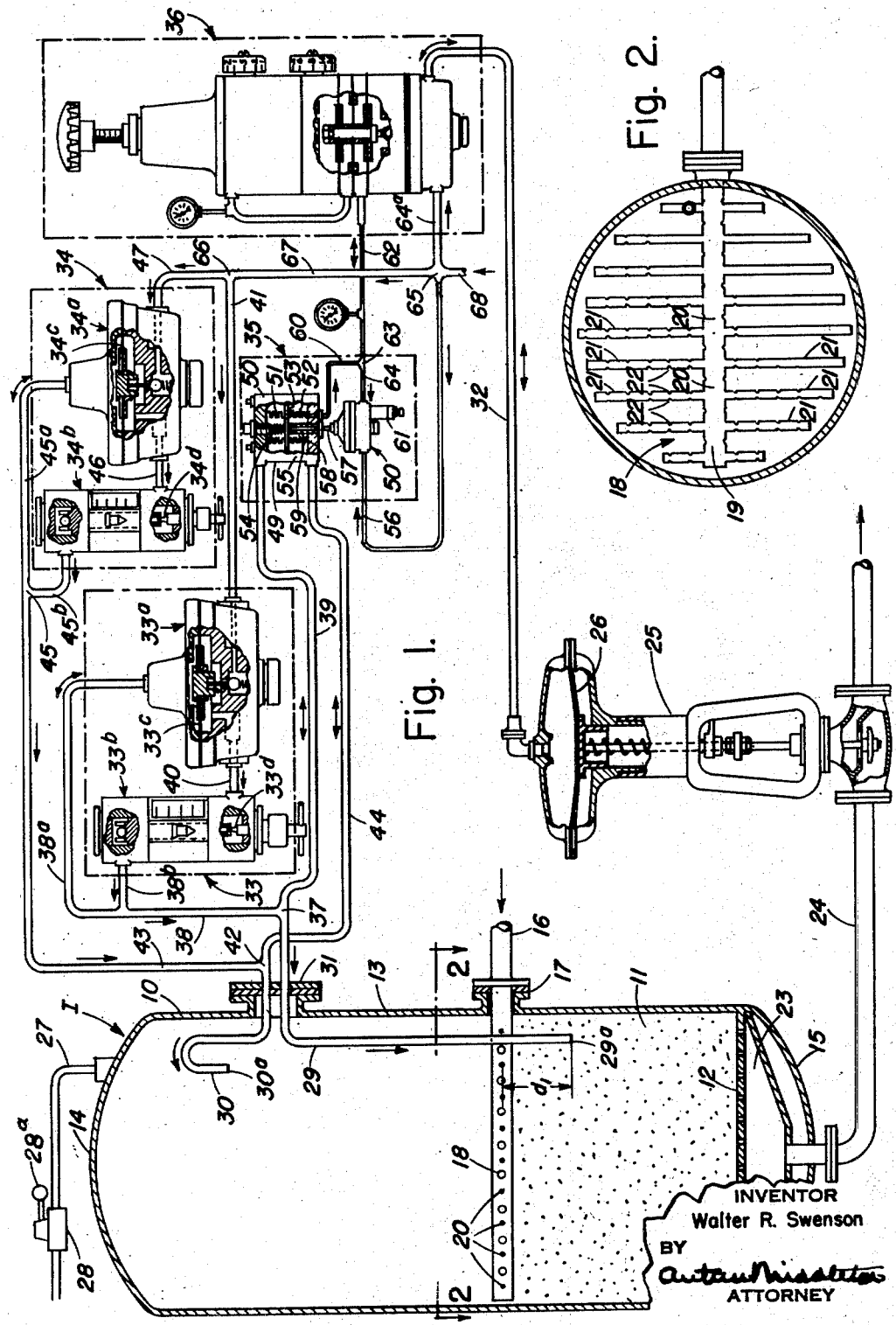
Aug. 1, 1950 — W. R. SWENSON — 2,517,051
APPARATUS FOR CONDUCTING ION EXCHANGE OPERATIONS
Filed June 3, 1949 — 5 Sheets-Sheet 1
INVENTOR
Walter R. Swenson

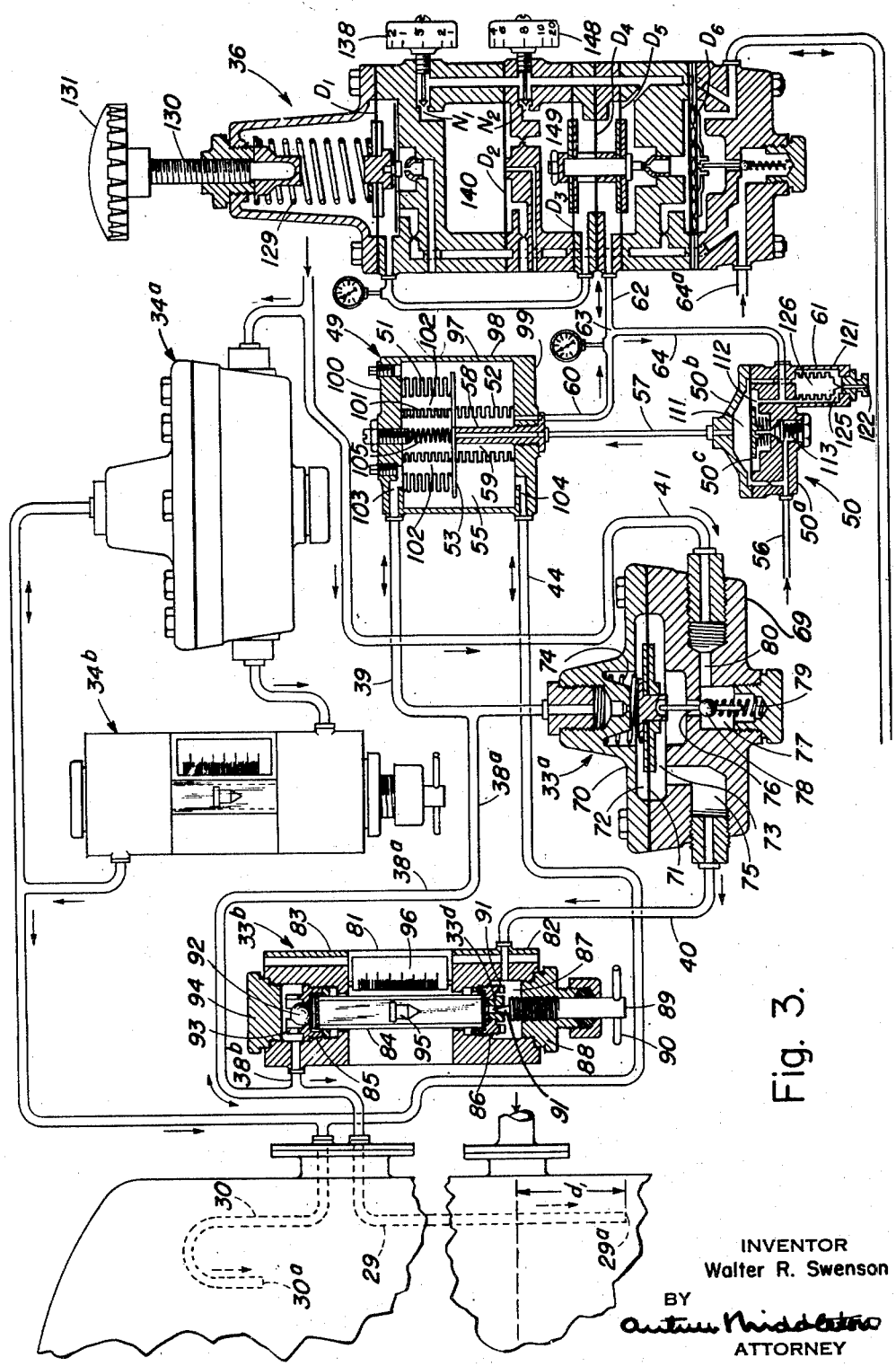

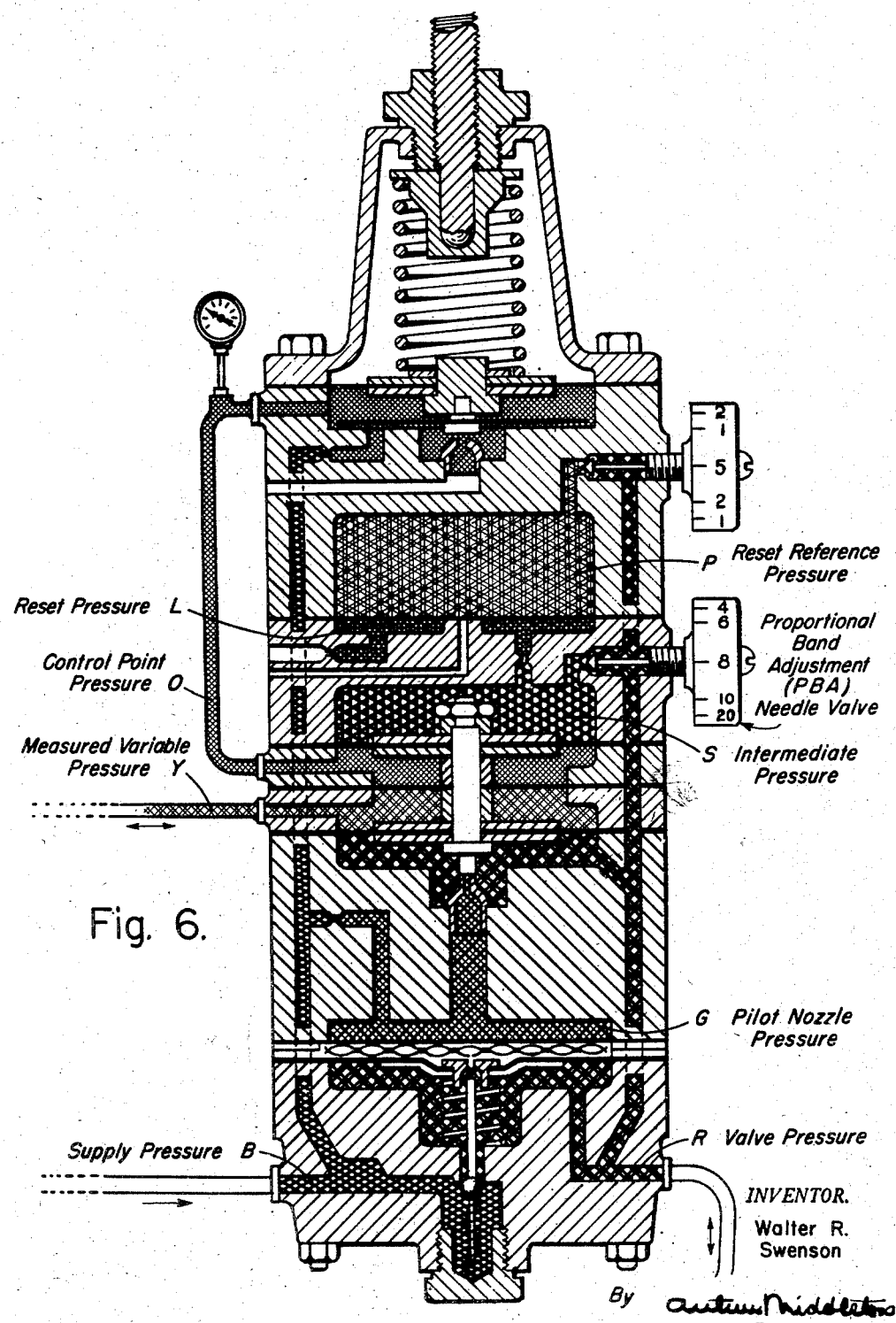

2,517,051

UNITED STATES PATENT OFFICE 2,517,051

APPARATUS FOR CONDUCTING ION EXCHANGE OPERATIONS

Walter R. Swenson, Flushing, N. Y., assignor to The Dorr Company, Stamford, Conn., a corporation of Delaware Application June 3, 1949, Serial No. 97,026

2 Claims. (Cl. 210—24)

This invention relates to ion exchange apparatus in which a liquid to be treated flows through a bed of granular ion exchange material in a manner whereby the bed is maintained in submergence in a container or tank. A container holding such material possibly along with certain appurtenances is also called or known as an ion exchange cell or briefly a cell.

It is desirable and important in the operation of such cells that the liquid level be maintained in the cell at or only slightly above the top of the bed, so that substantial submergence of the bed is insured, yet so that the accumulation of any substantial excess liquid volume above the bed is avoided.

More specifically, therefore, this invention relates to control devices for automatically maintaining the liquid level in the cell substantially constant and in a predetermined or desired relationship to the top of the bed.

A known level-control device utilizes primary control impulses derived from a float mounted on the container and actuated by the fluctuations of the liquid level. That is to say the location of the float or float device in effect determines the normal level which it is desired to have maintained in the tank. In other words, once the disposition of the float device is fixed on the container or tank, that location in turn substantially determines the top level, and hence the depth of the bed of exchange material in the tank, and vice versa. In the known device an outlet valve or throttling device discharging the treated or effluent liquid from the cell is controlled through relay means by the primary control impulses emanating from the float device. These relay effects vary the setting of the effluent valve automatically in accordance with and in a manner to compensate for the fluctuations of the liquid level. Such a known control mechanism operates to correct an undue rise or fall of the liquid level by correspondingly increasing or decreasing the effective through-flow area of the effluent valve or throttling device and thereby decreasing or increasing the through-flow resistance thereof.

More specifically, in the known control device the movements of the float are utilized to vary the admission of pressure of an auxiliary air pressure supply to a pressure-responsive diaphragm which in turn adjusts the setting of the effluent throttling valve. That is, rising of the float causes an incremental opening of the effluent valve, while falling of the float causes incremental closing of the valve.

Although it is desirable, as has been stated above, to maintain the liquid level as close as possible to the top of the bed while insuring its submergence, the functioning of the float nevertheless requires a depth of liquid above the bed well in excess of a desirable minimum, that is a depth, for example, in a practical instance of about 6 inches. The effect of that undesired excess liquid volume is characterized by its proportion relative to the liquid void volume, that is the volume in the void spaces in the bed of granular material. For example, on the assumption that the bed has a 50% void volume (although more than 50% or 50% to 60% is not unusual), in a bed of 3 feet depth, the 6 inches excess liquid required would represent one-third of the void liquid volume or one-fourth of the total liquid volume, that is of the sum of the void volume and the excess volume.

It is among the objects of this invention to provide automatic level control devices whereby the volume of excess liquid above the bed is minimized and drastically reduced by comparison with the known float-controlled device. Indeed, it is the object to reduce the excess liquid volume required for maintaining the control effective, from the 6 inches previously required to a range of 1" to ½" or even less.

Another object is to provide an improved automatic level control device which permits varying the control level by simple adjustment, that is without necessitating structural changes in the disposition or relocation of the control devices relative to the tank. With such a control device it should be permissible to increase or decrease the depth of the bed as the need arises, and by simple adjustment to shift the normal level to be maintained by the device, that is the reference level, by an amount corresponding to a desired change in the depth of the bed. In other words, such an improved level-control device should render the engineering determination of the depth of the bed substantially independent of the structural disposition of the level control devices; it will therefore do away with the need for certain structural dependencies and render more flexible engineering determinations and plant lay-out.

Still other objects are to provide control devices which avoid mechanical apparatus limitations by the use of hydraulically actuated or pressure-responsive impulse-translating means, and which lend themselves to remote control in the sense that they can be mounted a reasonable distance away from the tank, for example in connection with a central control panel serving a plurality or battery of exchange cells; and in connection with such remote control to provide means for visual indication of the liquid level, and capable of being associated with the control panel.

According to the concept of this invention the liquid level is maintained close to the top of the bed by measuring hydraulic pressure values proportionate to the fluctuations of the level, rather than allowing a float device to translate the fluctuations of the level mechanically to the relay means and then to the effluent valve.

According to this concept the liquid level is maintained close to the top of the bed by measuring or registering fluctuations of the liquid level in terms of pressure changes. To this end this invention proposes to derive pressure values proportionate to the level fluctuations by utilizing the hydraulic head represented by the level as a measurable pressure value that changes with a change of the liquid level and represents the variable to be regulated. Differentials of that value representing variations of the liquid level are relayed to effect a proportionate corrective setting of the effluent valve of the cell.

This concept provides for what is herein termed a pressure probe or pressure tap in the nature of a gas bubble pipe immersed to a suitable depth into the body of liquid in the cell and mainly into the bed of exchange material itself. The depth of immersion of this probe or tap represents the hydraulic pressure head which must be overcome by a uniform supply of auxiliary gaseous medium or compressed air that is being forced through the pipe at a controlled slow rate. This auxiliary medium, herein also called the purging or pressure gauging fluid, bubbles up through the liquid against the static hydraulic head as well as against whatever air or gas pressure may be acting upon the surface of the liquid. Such surface pressure may be the pressure of the atmosphere when the tank is of the open type or it may be super-atmospheric when the tank is of the closed type with a pressure air cushion of a desired constant pressure being maintained above the liquid.

The pressure of the bubble air represents a measure of the hydraulic head that varies with the liquid level. That is to say, an absolute measure of the variations of the liquid level in terms of varying hydraulic pressure or static head is obtained by deriving the differential between the higher pressure registering from the bubble pipe and the lower pressure acting upon the surface of the liquid, since that differential is the value of the static head per se as represented by the depth of immersion of the bubble pipe.

Referring to the example of the closed type tank, in order to derive this pressure differential, this invention proposes to provide the aforementioned high pressure tap together with a low pressure tap, the latter in the form of a pipe extending into the freeboard- or air cushion space in the tank and similar to the high pressure tap discharging pressure gauging or purging fluid (air) into the freeboard space. The differential of these pressures from both taps represents the variable to be measured, regulated or controlled and to be utilized as an impulse for effecting the control or compensatory setting of the effluent valve proportionate to the magnitude of the impulse. The control system for transmitting the pressure impulses from the pressure taps to the effluent valve is implemented by certain control equipment units which are known per se and are commercially obtainable.

Again, taking the closed type of tank as an example, there is supplied independently to each of the pressure taps a uniform automatically-controlled flow of compressed air. That is to say, each tap is supplied with this auxiliary gaseous medium or agent through a flow-control device which per se is known and the function of which is to supply the gaseous medium or fluid or compressed air at a rate that is constant irrespective of change of the pressure against which that medium is being supplied. The principle of such a flow-rate-controlling device is that it effects flow-control automatically by responding to changes in the pressure differential across an orifice. That is to say, this flow-rate or metering device utilizes the pressure differential principle which is biased upon the flow of liquid or of gas through a constriction or orifice. The differential of the pressures before and after the orifice is utilized to effect control or metering of the air supply to the orifice and to the pressure taps in proportion to fluctuations of such pressure differential. This metering pressure differential may herein be termed the orifice pressure differential as distinguished from the main pressure differential or pressure impulse which for the purpose of this invention is to be derived from the liquid level or static head conditions in the tank, and which is herein termed the tap pressure differential. One such flow control device is provided for each pressure tap to automatically maintain a constant orifice pressure differential for each tap and such a device is therefore herein termed a constant differential flow-control device or briefly a constant flow controller.

The implementation of the control system further provides pressure-transmitting and pressure-magnifying relay devices or units which receive the pressure impulses caused by variations of the tap pressure differential, which impulses adjust the effluent valve of the tank in a manner to maintain the liquid level therein. These relay devices comprise a differential pressure transmitter unit, and further a valve-actuating controller unit which in turn is relay-controlled by the transmitter unit. That is to say the pressures derived from each of the two pressure taps in the tank and from the flow controllers reach the differential pressure transmitter unit which evaluates the differential of these tap pressures and transmits a value corresponding to the tap pressure differential to the valve-actuating controller unit which in turn utilizes it to control through relay air pressure the diaphragm of the tank effluent valve and thus to maintain the liquid level in the tank at a predetermined height. Again, the differential pressure transmitter unit as well as the controller unit each per se are known and commercially obtainable.

The function of the relay units of this control system is based upon and due to the interaction of air pressure received by them and of relay air pressures transmitted by them. That is to say, a common source of constant auxiliary or relay air pressure may be provided for the relay operation of the various units of this control system. Hence, such auxiliary air-pressure provides the purging or gauging air that passes through and is controlled by the two constant flow-controllers. The reaction pressures of the purging air from these flow-controllers in turn react upon the differential pressure transmitter unit so that the same will emit a corrective impulse corresponding to the value of the tap pressure differential whatever its varying magnitude may be.

Auxiliary air pressure from the aforementioned source is also supplied to the differential pressure transmitter unit which through it is influenced to emit and impart proportionate control pressure impulses to the controller unit.

Again, air pressure from the aforementioned auxiliary source is supplied to the valve-actuating controller unit and the magnitude of this relay air pressure is such that it will properly influence the pressure responsive diaphragm adjusting the effluent valve of the tank for maintaining the liquid level therein at the desired point. The function of the valve-actuating controller unit is to modify the control pressure impulses which it emits in proportion to and substantially instantaneously with the control pressure impulses received by it from the differential pressure transmitter unit. In this way the controller unit acts to automatically restore and hold the liquid level in the tank at that pre-determined reference level for which the controller is adjusted and it will thus operate whenever any sufficient deviation or fluctuation of the liquid level should furnish and initiate the primary impulses for the operation of this control system.

It is an important feature in the operation of this liquid level-control system that the valve-actuating controller unit embodies means whereby its control response is adjustable so as to maintain automatically and within practical limits whatever reference level it is desired to have maintained in the tank. That is, a simple adjustment on the controller will shift the reference level either upwardly or downwardly to a new point at which it is to be maintained in the tank by the controller unit. Once the controller unit has been adjusted to operate on the basis of a desired reference liquid level in the tank, the controller will then automatically and continually compensate for any fluctuations of the level and thereby maintain a desired reference level.

In the drawings:

Fig. 1 is a diagrammatic overall view of the level control system operatively interconnecting the tank with the effluent control valve thereof.

Fig. 2 is a cross-section of the tank on line 2—2.

Fig. 3 is an enlarged view of the control devices of the system of Fig. 1, showing vertical sections of the devices such as the constant flow controllers, the differential pressure transmitter, and the controller unit.

Fig. 6 is a still further enlargement of the Fig. 5 sectional view of the flow controller, illustrating the operating pressures within this unit.

Figure 5:
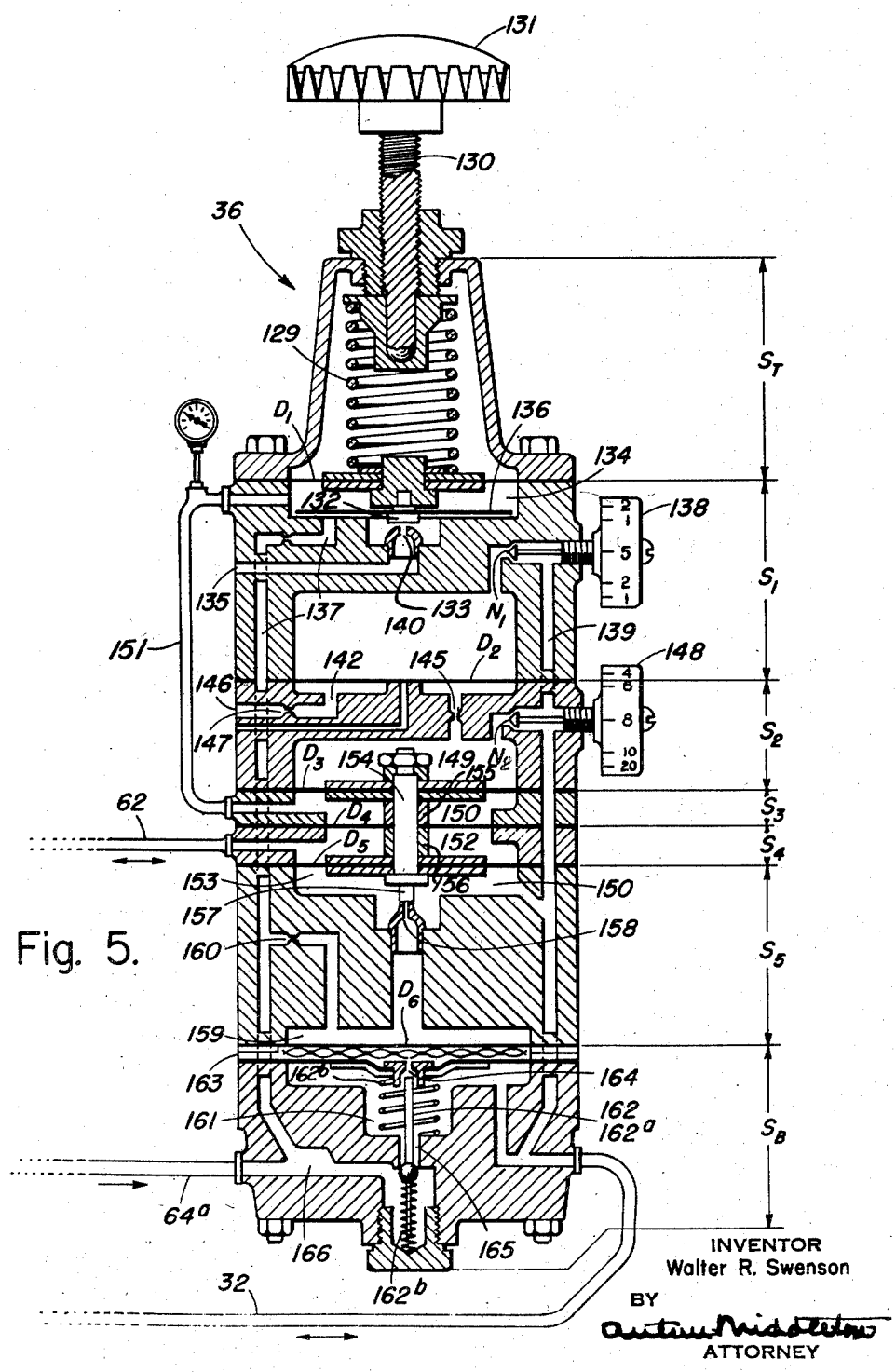
Fig. 5 is a further enlarged sectional view of the controller unit of Fig. 3.
Figure 4:
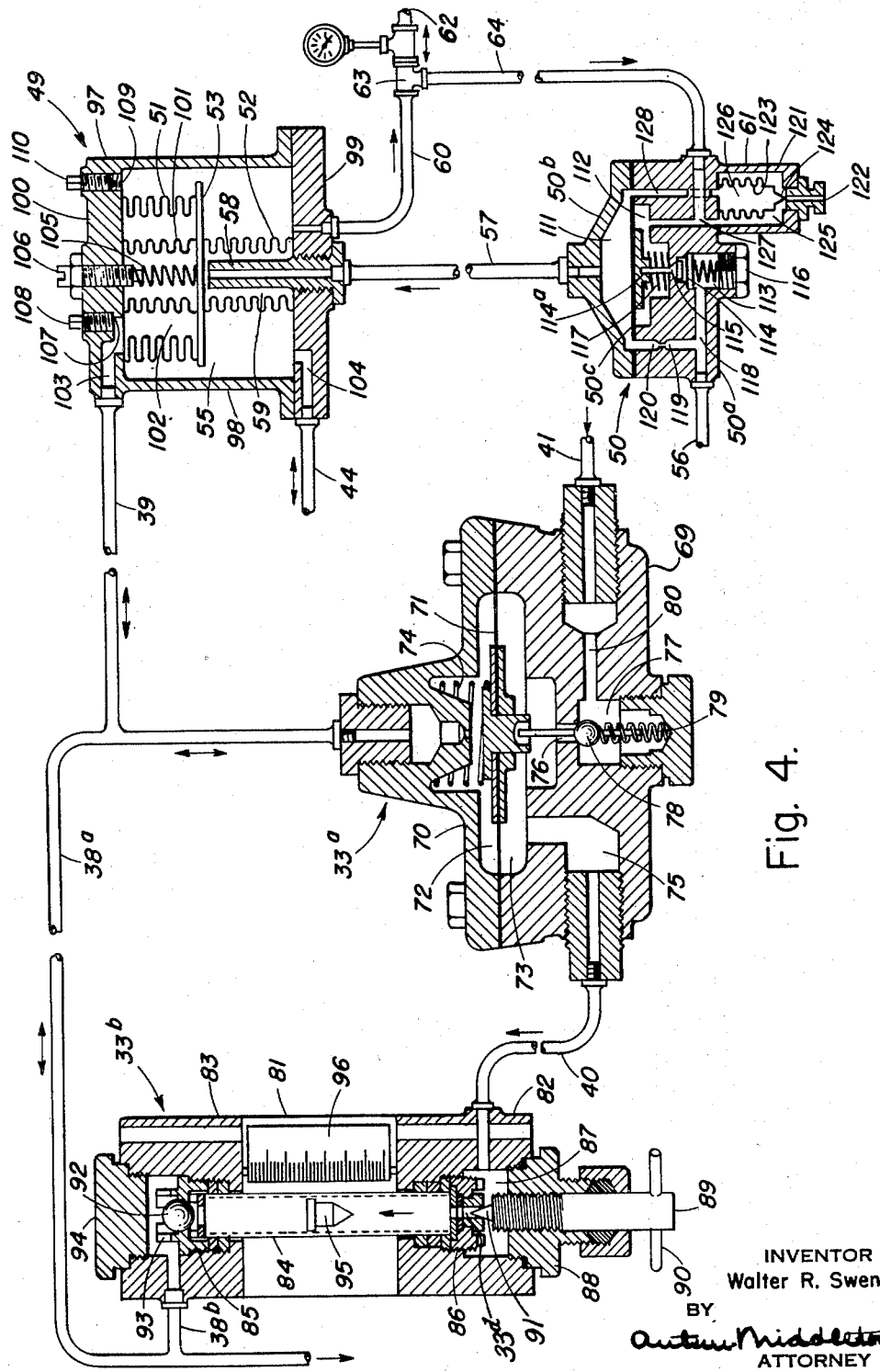
Fig. 4 is a further enlarged sectional detail view of one of the constant flow controllers and of the differential pressure transmitter of Fig. 3.

An ion exchange cell I in Fig. 1 is represented by a closed tank 10 in which a bed of granular ion exchange material herein briefly called the ion exchange bed is indicated at 11 supported by a perforated plate 12 usually called a constriction plate. The tank itself is of the closed type and comprises a cylindrical body portion 13, a top portion 14 and a bottom portion 15. An inlet pipe 16 leads into the tank at an elevation that substantially corresponds to the top of the ion exchange bed. This inlet pipe 16 has a flange connection 17 with the tank as well as with a distributing header 18 disposed within the tank. The distributing header 18 shown in its plan view in Fig. 2 comprises a main or header central portion 19 having lateral openings 20, and branch headers 21 extending laterally and horizontally from the main header portion 20 and having outlet openings 22. Liquid to be treated in the ion exchange cell or tank by contact with the ion exchange material enters the tank through the intake pipe 16 to be distributed by the header 18 substantially uniformly over the cross-sectional area of the bed 11. The feed of liquid into the tank as well as its discharge from the tank is such that the bed remains substantially submerged at all times during its operation.

The liquid passes downwardly through the bed through the perforated supporting plate 12 into a collecting chamber 23 formed by the plate 12 and the tank bottom 15, hence the liquid passes from the tank through a discharge or effluent pipe 24. An effluent control valve unit 25 is provided in the discharge pipe 24 and is controllable or adjustable by air pressure acting upon a diaphragm indicated at 26. Such diaphragm controlled valve unit is known per se. Its action for the present purpose is such that an increase of air pressure reaching the diaphragm will tend to close the valve whereas a decrease of air pressure upon it will tend to open the valve. An increment in the valve-opening will cause the liquid level in the tank to fall, while a decrease will cause it to rise.

An air cushion is maintained within the tank, that is in the closed space, and for maintaining such a cushion at a predetermined desired constant pressure, there is indicated a pressure air supply line 27 leading to the top of the tank. The pressure of this air cushion is automatically kept at a desired constant value as indicated by an automatic pressure control valve 28 with its pressure gauge 28a.

THE LIQUID LEVEL CONTROL SYSTEM

The control system proper operatively interconnects the tank 10 with the effluent control valve unit 25 through a series of interacting air pressure responsive control devices which constitute component units of the control system, these units per se being known and commercially available. The control system starts at the tank 10 with a pair of pipes herein called pressure taps, namely a high pressure tap and a low pressure tap as represented by a pair of pipes 29 and 30 respectively leading into the tank by way of a flange connection 31. The high pressure tap has an open end 29a for air discharge and extends downwardly into the bed of ion exchange material, for example a suitable distance $d_1$ from the top face of the bed. Auxiliary air herein also termed pressure gauging or purging fluid passes from pipe 29 against pressure which is the sum total of the static pressure head of the liquid column $d_1$ and the pressure of the air cushion above. The low pressure tap 30 has an open end 30a normally unsubmerged for the discharge of purging air into the air cushion space. At the opposite end the control system has an air pressure transmitting pipe 32 leading to and controlling the setting of the effluent valve unit 25 which in turn effects control of the liquid level in the tank.

Interposed between and operatively connected with the pressure taps 29 and 30 at one end, and with the pressure-transmitting pipe 32 at the other end are the aforementioned interacting component control units of the control system. These control units are represented by a constant flow controller 33 for the high pressure tap 29, a constant flow controller 34 for the low pressure tap 30, a differential pressure transmitter 35 and a final controller unit herein briefly termed the controller 36.

The two constant flow controllers 33 and 34 continuously supply auxiliary air to the pressure taps 29 and 30 respectively at a rate of flow which is kept constant by these flow controllers irrespective of variations of counter pressure in the tank 10. The differential pressure transmitter 35 evaluates the pressure differentials between the high pressure tap 29 and the low pressure tap 30 and emits a pressure according to that differential to the controller 36 which in turn translates it proportionately into relay air pressure for actuating the effluent valve 25 with the net result of compensating for any variations of the liquid level in the tank in order that this level be maintained substantially at a desired predetermined point, namely at the top face of the bed 11.

The constant flow controller 33 (for the high pressure tap) in turn consists of a pressure control device 33ª and a metering device 33ᵇ, while the constant flow controller 34 (which has a component control unit is identical to the constant flow controller 33) for the low pressure tap 30 consists of a pressure control device 34ª and a metering device 34ᵇ. The pressure control device 33 in turn has a pressure responsive diaphragm 33ᶜ upon which it relies for its operation. Similarly the pressure control device 34 has a pressure responsive diaphragm 34ᶜ. The metering device 33ᵇ has an adjustable orifice 33ᵈ, through which the purging air must pass and upon which it relies for its operation. Similarly the metering device 34ᵇ has an adjustable orifice 34ᵈ.

The pipe or high pressure tap 29 leads from the tank 10 to a branch point 37 connecting with a pair of branch pipes 38 and 39. The branch pipe 38 has a pair of sub-branches 38ª and 38ᵇ leading to the constant flow controller 33, that is to the pressure control device 33ª and to the metering device 33ᵇ respectively. The pressure control device 33ª is furthermore operatively interconnected with the metering device 33ᵇ by an air-flow pipe 40. The pressure control device 33ª is supplied with auxiliary pressure air through a pipe 41. The auxiliary air thus supplied passes through the pressure control device 33ª, then through pipe 40 to and through the metering device 33ᵇ leaving it by way of pipe 38ᵇ and passing on through branch pipe 38 and past branch point 37 into the high pressure pipe or tap 29 to issue from the open end 29ª thereof. As will be explained further below the differential of pressure before and after the orifice 33ᵈ of the metering device 33ᵇ influence the pressure control device 33ª in such a manner that the flow or purging air to the high pressure tap 29 is kept constant irrespective of pressure variations in the tank.

Similarly the low pressure pipe or tap 30 leads from the tank to a branch pipe 42 and thus into a pair of branch pipes 43 and 44. The pipe 43 leads to a sub-branch point 45 and thus into a pair of sub-branch pipes 45ª and 45ᵇ which lead to the pressure control device 34ª and to the metering device 34ᵇ respectively. The pressure control device 34ª is furthermore operatively interconnected with an air passage pipe 46. Auxiliary air pressure is supplied by a pipe 47 to the pressure control device 34ª and passes therethrough and then by way of pipe 46 to and through the metering device 34ᵇ. Controlled air-flow from the metering device 34ᵇ then reaches the low pressure tap 30 by way of the pipes 45ᵇ and 43. Again, the differential of pressures before and after the orifice 34ᵈ influences the pressure control device 34ª in such a manner that the flow of purging air to the low pressure tap 30 is maintained constant irrespective of pressure variations within the tank.

The pressure air supply for the constant flow controllers 33 and 34 may be derived from a common source such as is indicated by a branch point 66 joining the air supply pipes 41 and 47.

The differential pressure transmitter 35 evaluates the pressure differential between the high pressure tap 29 and the low pressure tap 30 herein termed the tap differential. Any variations of the tap differential in turn are proportional and correspond to variations of the liquid level in the tank. The differential pressure transmitter 35 responding to the tap differential or else to variations of the liquid level sends an actuating pressure representing the tap differential and herein termed the measured pressure to the controller 36 which in turn sends a corresponding controlling relay air pressure to the effluent valve 25 so that eventually the effluent area of the valve may be either increased or decreased as the case may be in proportion to the impulse received due to any variations of the liquid level in the tank with the net result that the liquid level is maintained substantially at a desired predetermined point.

The differential-pressure transmitter 35 as a unit comprises a differential-pressure responsive Sylphon device 49 and a pressure relay device 50 functionally interacting with and controlled by the Sylphon device 49. The operation of the Sylphon device 49 is in turn based upon the interaction of an upper Sylphon 51 with a lower Sylphon 52, both Sylphons 51 and 52 being interconnected yet separated by a floating plate of septum 53. Pressure reaction from the high pressure tap 29 reaches the interior 54 of the upper Sylphon 51 by way of pipe 39, while reaction pressure from the low pressure tap 30 reaches the chamber or space 55 surrounding these Sylphons by way of pipe 44. Any variation in the tap pressure differential, that is a variation of the liquid level in the tank thus manifests itself in a corresponding slight upward or downward movement of the floating plate 53.

The relay pressure device 50 receives auxiliary air pressure by way of an air supply pipe 56. Auxiliary air may pass through an air passage pipe 57 into the Sylphon device 49 then through an air nozzle 58 into the interior 59 of the lower Sylphon 52 whence it may discharge through an air passage pipe 60. Auxiliary air may pass from the relay pressure device 50 by way of an exhaust valve 61 controlled by the variations of the tap pressure differential received by the Sylphon device 49. The function of differential pressure transmitter 35 is such that it responds instantaneously to transmit a measured pressure proportional to the tap pressure differential to the controller 36 which in turn responds instantaneously to transmit relay control pressure to the effluent valve 25 for correcting any undue variations of the liquid level in the tank 10.

That is to say the measured pressure proportional to the tap pressure differential is transmitted to the controller 36 through a pressure transmitting pipe 62 which leads from a junction point 63 of pipes 64 and 60. This measured pressure operates within the controller 36 to vary a relay air pressure being supplied to the controller by a supply pipe 64ᵃ, the thus controlled relay pressure being transmitted from one controller 36 through pipe 32 to the effluent valve 25 and controlling the same in proportion to variations of the tap differential or variations of liquid level in tank 10. All auxiliary air or relay air supply pipes may derive the air from a common source, this being indicated by the pipe 56 joining pipe 64ᵃ at a junction point 65, this junction point in turn being interconnected with junction point 66 by pipe 67, and being supplied from a common source of pressure air indicated at 68.

Details of construction, function, and interaction of the component control units 33, 34, 35, and 36 (i. e. the two constant flow controllers, the differential pressure transmitter, and the final controller for the effluent valve) will be presented in the more detailed description of the control system that follows.

DETAILED DESCRIPTION OF THE CONTROL SYSTEM

A. THE CONSTANT FLOW CONTROLLER

(1) Structural description

As constant flow controller units 33 and 34 are alike in principle, it will herein suffice to describe the constant flow controller 33 and its function as representative. As mentioned above this unit comprises a pressure control device 33ᵃ and a metering device 33ᵇ. Auxiliary air or purging fluid passes from pipe 41 through the pressure control device 33ᵃ, then through air passage pipe 40 to and through the metering device 33ᵇ and finally through the high pressure pipe or tap 29 to a point of submergence in the tank 10, issuing in bubbles from the lower end 29ᵃ of the tap.

The pressure control device 33ᵃ comprises a body portion 69 and a top or cover portion 70, between which portions is confined a diaphragm 71. Above the diaphragm 71 is a pressure chamber 72 while below the diaphragm is a pressure chamber 73. The upper pressure chamber 72 may be termed the low pressure chamber being connected through pipe 38ᵃ to the downstream side of the metering device. The lower chamber 73 may be termed the high pressure chamber being connected through pipe 40 with the upstream or high pressure side of the orifice 33ᵈ. The upper chamber 72 has disposed in it a coil spring 74 which is a compression spring confined between the cover member 70 and the diaphragm 71, and which because of its function within this device is being termed the differential pressure spring. The lower chamber 73 has a passage 75 leading to pipe 40, another passage 76 leading to a valve chamber 77 in which is disposed a valve member 78 sustained by a light spring 79 just sufficient to balance the seat of the valve member. A passage 80 connects the valve chamber 77 with the air supply pipe 41.

The metering device 33ᵇ comprises a body portion 81 having a head portion 83 and a foot portion 82, both head and foot portions being interconnected by a vertical glass tube 84 the top and foot ends of which are sealed off by means of stuffing boxes 85 and 86 provided in the head portion 83 and the foot portion 82 respectively. The foot portion 82 has an inlet chamber 87 receiving controlled airflow through pipe 40 from the pressure control device 33ᵃ. The chamber is closed off at the bottom by a screw cap member 88 into which in turn is threaded an orifice adjusting member 89 having at its outer end a handle 90 and at its inner end a thorn 91 which is thus adjustable up and down for varying the through-flow area of the orifice 33ᵃ provided in the lower stuffing box 86. The upper stuffing box 85 has a ball check valve 92 leading into an outlet chamber 93 disposed in the head portion 83 and closed by a screw cap member 94. Purging air passing from pipe 40 into the metering device 33ᵇ must pass through the inlet chamber 87 and through the orifice 33ᵈ, then upwardly through the glass tube 84 past the ball check 92 and outlet chamber 93, and out through pipe 38ᵇ and pipe or tap 29. Within the glass or transparent tube 84 is a flow indicator member or floating plug 95 kept in suspension by the upward flow of air in the tube. The position of this floating member 95 indicates the flow intensity or rate of upward air-flow through the tube and its magnitude can be defined by a scale 96 provided upon the body portion 81 of the metering device.

(2) Functional description

For the purpose of maintaining a constant rate of flow of purging air to and through the pressure tap 29 the pressure controller device 33ᵃ co-acts with the metering device 33ᵇ in such a manner that a constant pressure differential is maintained between the upstream side and the downstream side of the orifice 33ᵈ irrespective of variations of the counter pressure within tank 10. That is to say, when this orifice pressure differential decreases due to an increase in counter-pressure, that increased pressure will depress the diaphragm 71 and with it the valve member 78 to reduce the throttling effect of valve member 78 for air passing from the valve chamber 77 through passage 76 to the metering device or upstream side of the orifice 33ᵈ. This will restore the desired orifice pressure differential.

Vice versa when the counter-pressure for tap 29 decreases, the upstream orifice pressure in chamber 73 will force the diaphragm 71 upwardly permitting the valve member 78 to fall and accordingly to throttle the flow through passage 78. This again will restore the desired pressure orifice pressure differential.

In other words, the pressure in the upper pressure chamber 72 above the diaphragm 71 of the pressure control unit is always lower than the pressure under the diaphragm 71 because of the constant force exerted by the pre-loading or differential pressure spring 74. The diaphragm 71 actuates the valve member 78 which may admit purging liquid to orifice 33ᵈ and past to needle valve member 89 of the metering device 33ᵇ.

Thus the pressure control device 33ᵃ maintains a constant differential pressure across the metering device 33ᵇ, equal to the compressive pressure value of the spring 74 and independent of variation of the pressure upstream or downstream of the needle valve member 89.

B. THE DIFFERENTIAL PRESSURE TRANSMITTER

(1) Structural description

As stated above the differential pressure transmitter 35 comprises a Sylphon device 49 and the pressure relay device 50 herein also termed the booster pilot valve or booster valve unit because its function is to proportionately increase the tap pressure differential received by the Sylphon device 49 at a constant ratio. As will be seen further below the response of this differential pressure transmitter is substantially instantaneous in that each change of the tap pressure differential received by it as impulse is instantaneously translated into a proportionately higher relay pressure transmitted to the controller 36 for actuating the effluent valve 25. That is the booster pilot valve unit 50 brings in a higher or relay air pressure placed under the influence of the Sylphon device 49 in such a manner that variations of the tap pressure differential received by the Sylphon device will vary the relay pressure in proportion. This proportionately increased or diminished pressure constitutes what has above been termed the measured variable pressure transmitted to the controller unit 36 in which it acts again through the medium of a relay fluid pressure supply to the controller, and which proportionately actuates the effluent diaphragm controlled valve 25 in a compensatory fashion correcting variations of the liquid level in tank 10.

The Sylphon device 49 comprises a housing 97 having a cylindrical body portion 98, a bottom portion 99, and a top portion 100, which housing contains a differential pressure-responsive system or combination of expansion diaphragms—so-called Sylphons or bellows. This combination of Sylphons comprises the upper large diameter bellows 51, the lower smaller diameter bellows 52, and a third or inner bellows 101 surrounded by the bellows 51. The bellows 51 and 101 are concentric and have their upper ends connected to the underside of the top portion 100 while their lower ends are connected to the floating plate 53. The lower bellows 52 shown to have the same effective diameter as the inner upper bellows 51 has its upper end connected to the underside of the floating plate 53 and its lower end to the bottom portion 99 of the housing 49. Thus there are established an annular inner pressure chamber 102 between the bellows 51 and 101, the outer annular pressure chamber 55 surrounding and represented by the space between the Sylphon combination of bellows and the surrounding housing assembly, and the pressure chamber 59 within the lower bellows 52. The upper inner pressure chamber 102 communicates with the pipe 39 (and thus with the high pressure tap 29) through a port 103 in the top portion 100 of the housing. The outer annular pressure chamber 55 communicates with the pipe 44 (and thus with the low pressure tap 30) through a port 104 in the bottom portion of the housing.

A compression coil spring 105 acting as a balancing spring is disposed within the upper inner bellows 101 and is confined between the floating plate 53 and the top portion 100 of the housing, the degree of compression of the spring being adjustable by means of an adjusting screw 106 provided in the top portion 100. The top portion 100 has a tap hole 107 for the upper inner pressure chamber 102 closed by a cap screw 108 and a tap hole 109 for the outer pressure chamber 55 and closed by a cap screw 110. The discharge nozzle 58 for relay pressure air is screwed into the bottom portion 99 of the Sylphon device 49 and extends upwardly within the lower bellows 52 terminating at the underside of the floating plate 53. The floating plate 53 by this arrangement is held yieldingly against the mouth of air nozzle and offers resistance to the discharge of the relay air from the nozzle into the lower inner chamber 59. The pressure which tends to urge the floating plate 53 against the mouth of nozzle N varies with variations of the tap pressure differential, and accordingly varies the resistance offered by the plate to the discharge of the relay air from the nozzle.

Relay air pressure is supplied to the nozzle N through pipe 57 from the booster valve unit 50, discharging against the resistance of the floating plate 53 it may escape through the pressure chamber 59 into pipe 60 to branch point 63 connecting through pipe 64 with the booster valve unit 50 and through pipe 62 with the controller unit 36.

The booster valve unit 50 comprises a body portion 50ᵃ and a top or cover portion 50ᵇ between which portions is confined the pressure responsive diaphragm 50ᶜ. Thus there are established an upper pressure chamber 111 above, and a lower pressure chamber 112 underneath the diaphragm 50ᶜ. Valve chamber 113 is provided underneath the lower chamber 112 and connects therewith through a passage 114 presenting an inverted valve seat for receiving a booster valve member 115 sustained by a compression spring acting as a weight-balancing spring for the valve member and confined between the valve member and a cap screw 116 constituting the bottom of the valve chamber 113. The stem 114ᵃ of the valve member extends upwardly terminating at the underside of diaphragm 50ᶜ to be actuated thereby. The valve stem 114ᵃ is surrounded by a compression coil spring 117 which is confined between the bottom of pressure chamber 112 and the underside of diaphragm 50ᶜ. This spring 117 because of its function in the operation of this device is termed a differential pressure spring as will be further explained in the operation of this device.

Relay air pressure, that is filtered air from a constant pressure source, is supplied through the pipe 56 to the booster valve unit 50 in which it reaches the valve chamber 113 through a conduit 118. A portion of this auxiliary air may pass from conduit 118 through a branch conduit 119 leading into upper pressure chamber 111 and having interposed in it a metering orifice 120.

The body portion 50 of the booster valve unit is provided with an automatic bleeder valve 61 comprising a housing portion 121 extending downwardly from the booster valve unit and provided at its lower end with an exhaust opening 122. This bleeder valve further comprises a valve member in the form of an expansion diaphragm or bellows 123 the lower end of which is closed and forms a valve portion or thorn 124 adapted to open or close the exhaust opening 122 as the bellows 123 expands or contracts. Thus there are established in the bleeder valve 61 an outer pressure chamber 125 between housing portion 121 and bellows 123, and an inner pressure chamber 126 within the bellows or expansion valve member 123. A conduit 127 connects the outer pressure chamber 125 with the diaphragm pressure chamber 112 as well as with the pipe 64. Another conduit 128 connects the interior pressure chamber within the bellows 123 with the upper diaphragm chamber 111.

The response of the differential pressure transmitter 35 to variations of the tap pressure differential is briefly this:

The high pressure tap 29 connects with the inside of the large bellows 51 in the Sylphon device 49, while the low pressure tap 30 connects with the opposite side, namely with the pressure chamber 55. Any increase or decrease of differential pressure across the large bellows 51 is instantly balanced by the air pressure in the pressure chamber 59 of the lower bellows 52 because of the function of the booster valve unit 50. Auxiliary air from a supply source of constant pressure filtered air flows through the restriction or metering orifice 120 to the top of diaphragm 50ᶜ and through pressure chamber 111 and pipe 57 into the Sylphon unit 49, that is through nozzle N against the resistance of floating plate 53 into the pressure chamber 59, thence to escape through pipes 60 and 64 back to and through the booster valve unit 50. Having returned to the booster valve unit the auxiliary air passing through conduit 128 reaches the outer pressure chamber 125 of the bleeder valve 121 and may escape through its exhaust opening 122, even as its pressure reaches the pressure chamber 112 to react upon the underside of the diaphragm 50°. At the same time the bellows of the bleeder valve member 123 is interiorly subjected to the pressure from the top of diaphragm 111 through conduit 128. Thus the bleeder valve member 123 is subjected to or balanced or controlled by the pressure from chamber 111 (before the nozzle N) counteracting the pressure in chamber 59 (after the nozzle N).

The auxiliary air from pipe 56 may also be admitted through the pilot valve, that is from the valve chamber 113 past pilot valve member 114 to underside of diaphragm 50°, namely into the lower pressure chamber 112 which in turn communicates with the outer pressure chamber 125 of the bleeder valve and thus with the exhaust opening 122.

Any increase or decrease of differential pressure (that is variation of tap pressure differential) acting upon the bellows 51 and 52 tends to move the floating plate 53 to or from the mouth of nozzle N, as the case may be, thereby causing respectively an increase or decrease of pressure upon the top side of diaphragm 50° controlling the pilot valve member 114. Immediately this pressure change is balanced as air is either admitted through the pilot valve or exhausted through the automatic bleeder valve 121. The auxiliary air pressure thus balanced in proportion to impulses from the pressure taps (variations of tap pressure differential) maintains the lower bellows 59 in a condition of equilibrium with respect to the mouth of nozzle N. Consequently, the balanced pressure after the nozzle in chamber 59 and pipe 60 represents the net relay pressure varying in proportion to the tap pressure differential received, and thus represents what is herein termed the measured variable pressure that reacts upon the controller unit 36 which in turn transmits proportionate control impulses or relay pressures to the effluent valve to compensate for liquid level fluctuation in the tank 10.

It will be seen from the pneumatic circuit or pneumatic system operating within the differential pressure transmitter 35 that the pressure in nozzle 58 is always higher than the balance pressure offered by the floating plate 53 by the amount of force exerted by the spring 117 under the booster valve diaphragm 50°, which spring 117 is therefore herein termed a differential pressure or pre-loading spring. The differential pressure at the nozzle mouth, that is the differential between the pressure within the nozzle and the pressure in chamber 59 surrounding the nozzle is therefore always the same regardless of the pressure in the bellows 51 and 52, insuring practically the same fixed distance between the nozzle mouth and the floating plate 53.

(2) *Functional description*

If, due to a rise of liquid level, an increased tap pressure differential reaches the Sylphon device 49, the differential pressure transmitter will respond as follows:

This increase in pressure through pipe 39 and pressure chamber 102 forces floating plate 53 downwardly against air pressure from nozzle 58 thereby building up pressure in pipe 57 which pressure is that of the auxiliary air supply throttled down through the fixed orifice 119. At the same time this built up pressure reaches the interior of the expansion valve member 123 through conduit 128, this valve member is normally sufficiently open or balanced or cracked to exhaust an amount of air equal to that normally passing through orifice 119, pipe 57, nozzle 58, pipes 60 and 64, and chamber 125 to exhaust 122.

The thus increased pressure in chamber 111 of unit 50 depresses diaphragm 50° thereby depressing pilot valve member 114 thus admitting pressure air from pipe 56 to the underside of diaphragm 50° and at the same time into outer pressure chamber 125 as well as through pipes 64 and 60 into chamber 59 as well as through pipe 62 into chamber 152 of controller unit 36. This pressure in turn because of the previous closing of valve member 123 continues to build up acting upon the underside of plate 53, until it balances the force exerted upon the top of that plate. Hence, for a given pressure increase imparted to the top of the plate 53, the corresponding proportionate pressure increase is thus imparted to the chamber 152 of controller unit 36 which in turn sets the effluent valve to compensate for the increase of the level. In other words the balance of forces between the top- and the under side of the plate 53 is attained when the difference of pressures in pipes 57 and 64 has become equal to the pressure of the spring 117 exerted upon the underside of the diaphragm 50°.

By virtue of the balanced condition being established, the inner and the outer pressure acting upon the exhaust valve member 123 also become balanced relative to each other so that again the normal amount of auxiliary air escapes from exhaust 122, namely the air which is continuously escaping through orifice 119 and from nozzle 58.

That is to say, because of the initial impulse of the tap pressure differential there will now have become established higher pressures in pipes 57 and 64 proportional to the increment of the impulse received although the differential of these increased pressures will have remained the same and equal to the pressure exerted by spring 117. Thus the pressure of that spring equals the pressure drop across the nozzle 58, that is the drop of pressure within the nozzle to the pressure around the nozzle.

Vice versa, if due to a drop of the liquid level a decreased tap pressure differential reaches the Sylphon device 49, then the differential pressure transmitter unit 35 will respond as follows:

This decrease in pressure through pipe 39 and chamber 102 causes the floating plate 53 to move upwardly away from nozzle 58, thereby reducing pressure in pipe 57 which pressure is that of the auxiliary air supply throttled down through the fixed orifice 119. At the same time this reduced pressure reaches the interior of the exhaust valve member 123 through conduit 128. This exhaust valve member is normally cracked, that is held under a balanced inside and outside pressure to be sufficiently open to exhaust an amount of air equal to that normally passing through orifice 119, pipe 57, nozzle 58, pipes 60 and 64, and chamber 125 to exhaust 122.

The above assumed decrease of pressure in chamber 111 insures closure of pilot valve 114. This pressure continues to reduce until it balances the force on top of floating plate 53. Hence for a given pressure decrease imparted to the top of the plate 53 a correspondingly proportionate pressure decrease is thus imparted through pipe 62 to the chamber 152 of the controller unit 36 which in turn correspondingly sets the effluent valve.

In other words, again the balance of forces between the topside and the underside of the plate 53 is attained when the difference of pressure in pipes 57 and 64 has again become equal to the pressure of spring 117 exerted upon the underside of diaphragm 50c.

By virtue of this balanced condition being established, the inner and outer pressures upon the exhausted valve member 123 also become balanced so that again the normal amount of auxiliary air escapes from exhaust 122, namely the air continually escaping through orifice 119 and from nozzle 58.

That is to say, because of the initial impulse of the tap pressure differential there will now have become established a lower pressure in pipes 57 and 64 proportionate to the change of impulse (tap pressure differential), while the differential between these lower pressures in pipes 57 and 64 will have remained the same and indeed equal to the pressure of spring 117. Thus the pressure of that spring equals the pressure drop across the nozzle 58, that is the drop of pressure within the nozzle to the pressure surrounding the nozzle.

The variable pressure transmitted from the differential pressure transmitter unit 35 through pipe 62 to the controller unit 36 is what is hereinafter termed the measured variable Y in the following description of the controller 36.

C. THE CONTROLLER UNIT

(1) Structural description of the controller unit

The functioning of the controller unit 36 is to respond to control impulses from the differential pressure transmitter 35 in such a manner that, whenever the control system as a whole is in balance, the controller unit 36 transmits to the effluent control valve 25 a relay pressure for actuating it corresponding to each particular pressure or impulse sent to it from the differential pressure transmitter 35. However, if the control system becomes unbalanced as a result of a change of the liquid level in tank 10, then the controller 36 will first attempt to transmit a relay pressure or force which is in direct proportion to the measured variable pressure which it receives from the differential pressure transmitter 35. If, because of a sustained change of conditions in the tank, this does not bring the differential pressure back to a normal value, that is a value corresponding to a control point about which the controller 36 normally operates, then the controller will bring into play what is herein termed the reset reference pressure which will operate to either increase or decrease the relay pressure or force which is being sent from the controller to the effluent valve 25. This reset reference pressure will continue either to magnify or to diminish this relay force as the case may be until the measured differential pressure reaches a value corresponding to the control point. At this time the action of the controller will reverse itself, and the measured differential pressure will go beyond the value that corresponds to the control point. Consequently, the action of the controller 36 will then be the reverse of that just set forth until such time that the actuating pressure transmitted from the controller to the diaphragm of the effluent valve 25 is again in direct proportion to the measured variable pressure issuing from the differential pressure transmitter 35.

The controller 36 functions in response to varying conditions in the tank 10 in a manner which will be more fully understood in view of pressure conditions in various pressure chambers as well as in view of the operation of various diaphragm controlled valves or ports, air passage orifices or flow constrictions, and adjustable needle valves, all within the controller 36, and described in greater detail as follows:

Referring more particularly to Fig. 5 the controller 36 comprises a top section $S_T$, a bottom section $S_B$, and between them intermediate sections $S_1$, $S_2$, $S_3$, $S_4$, and $S_5$. Confined between the sections $S_2$ and $S_1$ is a first diaphragm $D_1$ which is being subjected to the downward pressure of a differential spring 129 the tension of which is adjustable by a screw 130 having a handle knob 131. This diaphragm $D_1$ is outwardly under the pressure of spring 129 as well as under pressure of the atmosphere. This diaphragm $D_1$ represents a valve member 132 at its underside which opens or closes an air passage orifice 133 provided in section $S_1$, which orifice connects a pressure chamber 134 at the underside of diaphragm $D_1$ with an exhaust conduit 135. The diaphragm $D_1$ also carries at its underside a valve disk 136 which opens or closes a conduit 137. The section $S_1$ has a needle valve $N_1$ which has a graduated hand knob 138 by means of which it is adjustable to open or to close or to vary the through-flow passage for air from a conduit 139 to a pressure chamber 140.

A second diaphragm $D_2$ is interposed between the sections $S_1$ and $S_2$ separating the pressure chamber 140 above from a pressure chamber 142 below the diaphragm, the latter chamber 142 communicating with a pressure chamber 143 through a constriction or air passage orifice 145. The diaphragm $D_2$ may operate to open or close an exhaust conduit 146 which has interposed in it a constriction or air passage orifice 147. The pressure chamber 143 connects with the conduit 139 through a needle valve $N_2$ which has a graduated hand knob 148 whereby it is adjustable to open or to close or to vary the flow passage for air from the conduit 139 into the chamber 143, and this is what will hereinafter also be called the proportional band adjustment (P. B. A.) needle valve.

The sections $S_2$ and $S_3$ have interposed between them a third diaphragm $D_3$ separating the pressure chamber 149 above from the pressure chamber 150 below. A pipe 151 interconnects the chambers 150 and 134.

The sections $S_3$ and $S_4$ have interposed between them a fourth diaphragm $D_4$ separating the chamber 150 above from a pressure chamber 152 below, the latter chamber receiving through pipe 60 the measured differential pressure from the transmitter 35.

The sections $S_4$ and $S_5$ have interposed between them a fifth diaphragm $D_5$ which separates the chamber 152 above from a pressure chamber 153 below, the latter chamber communicating directly with the conduit 139.

The diaphragms $D_3$, $D_4$, and $D_5$ constitute a functional unit in that their central portions are interconnected and rendered unitary by means of a bolt 154 and spacers 155 and 156 provided between respective diaphragms. The lower end of the bolt 154 projects below the diaphragm $D_5$ to constitute a valve member 157 which may open or close an air passage orifice 158 connecting the pressure chamber 153 with a pressure chamber 159, this latter chamber in turn communicating through a constriction or air passage orifice 160 with the conduit 137.

The sections $S_5$ and $S_6$ have interposed between them a diaphragm $D_6$ which separates the chamber 159 above from a pressure chamber 161 below. The diaphragm $D_6$ has a dual function in that it not only actuates a valve member 162, but also in conjunction with the valve member 162 acts in itself as an exhaust valve. That is, the diaphragm $D_6$ has embodied in it an exhaust conduit 163 connecting through an air passage orifice 164 with the chamber 161. Relative movement between the diaphragm $D_6$ and the valve stem 162ª of member 162 may either close or open the orifice 164 as the case may be. That is a sufficient upward movement or bulging of the diaphragm $D_6$ will open a flow passage through air passage orifice 164 as it moves away from the valve stem 162ª, and allow the chamber 161 to exhaust through conduit 163. Conversely, a sufficient downward movement or bulging of the diaphragm $D_6$ will close the exhaust passage through air passage orifice 164 as that orifice closes upon the valve stem 162ª. Indeed the downward movement of diaphragm $D_6$ may be such as to depress the valve member 162 sufficiently against the pressure of a spring 162ᵇ to open air flow passage 165 leading into the chamber 161 from a pressure chamber 166 below which latter chamber connects with the pipe 64 that supplies relay pressure air. The chamber 166 also connects with the conduit 137, while the chamber 161 connects with conduit 139 and also with pressure pipe 32 leading to the diaphragm chamber of the effluent control valve 25.

(2) *Functional description of the controller unit*

In addition to the detailed structural description of the controller as shown in Fig. 5, there will now be rendered its operational description or functional analysis in terms of pressure impulses received, pressure impulses emitted, and intermediate pressure effects manifesting themselves within the controller, namely in the various pressure chambers and conduits therein, and therefore also manifesting themselves upon the various diaphragms within the controller. To this end reference is had to Fig. 6.

In Fig. 6 for the purpose of this functional analysis there have been applied distinctive contrasting types of shading or marking to the areas representing the various pressure chambers and conduits, and these pressure areas are further identified by characters. With the aid of these characters the following operational analysis of the controller unit may now be rendered in terms of equations of pressure.

This controller is a commercially available unit which is or may be termed a proportional reset controller for reasons which will appear in the course of this functional analysis. At any rate, the purpose and function of this controller in its present environment is to impart actuating pressures to the effluent valve 25 which pressures are in proportion to the pressure impulses received by the controller as a result of variations of the liquid level in tank 10. A corrective or compensatory setting of the effluent valve is thus effected to the end of maintaining the liquid level at a predetermined point. For the purpose of this analysis the operational pressure acting within the controller have been termed and designated as follows:

Supply pressure (relay air) _____ B
Control point pressure _____ O
Measured variable pressure _____ Y
Reset reference pressure _____ P
Reset pressure _____ L
Intermediate pressure _____ S
Pilot nozzle pressure _____ G
Effluent valve pressure _____ R These operational pressures are also in Fig. 6 of the drawings by the constrasting manner of shading of the respective pressure areas or spaces in the unit.

The meaning of these operational pressures will explain itself as this analysis proceeds.

This is a "Proportional-Reset Controller," which means that its response to a deviation from the control point (or desired value of the measured variable pressure) will manifest itself as an immediate change in the Effluent valve pressure R proportional to the deviation, accompanied by a more gradual change in the Reset reference pressure P. The change in the valve pressure R (that is the relay air pressure imparted to the effluent valve 25) causes a change in the setting of the control valve 25 and that tends to minimize the deviation and bring the measured variable pressure back to the control point. If the cause of the deviation is only a momentary disturbance or upset, equilibrium will be re-established as the Measured variable pressure Y returns to its original valve. In that case, the Reset reference pressure P will begin to change only, and then return to its original value. If, however, the cause of the deviation is some more permanent condition which requires a new setting of the control valve to maintain the Measured variable pressure Y at the desired value, the Reset reference pressure P will continue to change as long as the Measured variable pressure Y deviates from the Control point pressure O. A change in the Reset reference pressure P produces a similar change in the Reset pressure L and Intermediate pressure S. The effect of this is to permit equilibrium to be reached with a new value of Valve pressure R but with the Measured variable pressure Y in agreement with the Control point pressure O.

It is important to note here that proportional controller action causes the effluent control valve 25 to change promptly by an amount proportional to the deviation of the measured variable pressure from the control point pressure. If there is no deviation there is no change in the setting of the control valve. If a new condition requires a new setting of the control valve, a controller having proportional action only, will reach equilibrium with the measured variable pressure differing from the control point pressure by whatever amount is necessary to hold the control valve at the new setting. If the controller has both proportional and reset action, it will promptly move the control valve in proportion to the deviation, and gradually adjust for the new condition so equilibrium will be reached with the new control valve setting but with the Measured variable pressure Y and Control point pressure O in agreement.

To see how the above action is accomplished, assume that the pressure system within the controller is in equilibrium which means that $Y=O$ and $S=R$, also $P=L=S=R$. For the purpose of this explanation, suppose the reset rate needle valve is shut off so the controller will have proportional action only. Then assume that due to some change in the process the Measured variable pressure Y increases by a constant amount.

The downward force exerted by Y on the diaphragm assembly $D_3$, $D_4$, $D_5$ is greater than its upward force by an amount proportional to the difference in areas of the diaphragms below and above the Measured variable pressure Y. The downward force of Y is opposed by the upward force of O on an equal area; likewise the upward force of Y is opposed by the downward force of O on an equal area. The net result of that is a downward force of $K(Y-O)$, where K is a constant determined by the difference in areas mentioned. This downward force tends to close the pilot nozzle and increase pressure G which forces down the pilot diaphragm $D_6$ and valve member 162. Then air from the supply B is admitted, increasing pressure R. When R increases it becomes greater than S so there will be a flow from R to S through the proportional band adjustment (P. B. A.) needle valve. That increases pressure S which adds to the downward force on the diaphragm assembly $D_3$, $D_4$, $D_5$ and causes R to increase further. This continues until R and S have each increased to such values that the quantity of air escaping through the restriction between S and L equals the quantity flowing through the P. B. A. needle valve at which time S will no longer increase and equilibrium will be reached. Equilibrium requires that the net downward pressure on the diaphragm assembly $D_3$, $D_4$, $D_5$ equal the net upward pressure which is then $S+KY=R+KO$ or $R-S=K(Y-O)$ and $S=R-K(Y-O)$.

Also $S=R$ (pressure drop across the P. B. A. needle valve). Therefore the pressure drop across the P. B. A. needle valve is $K(Y-O)$. The flow of air through any restriction is proportional to the square root of the pressure across the restriction, so the flow from R to S is proportional to $VK(Y-O)$. The same flow must go through the restriction between S and L and, as the pressure drop across a restriction is proportional to the square of the flow, pressure $S-L$ is proportional to $(VK\ Y-O)^2$; hence, $S-L$ is proportional to $K(Y-O)$ so that the following equation may be written:

$$S=L+C(Y-O)$$

(where C is a constant dependent on the size of the restriction, the setting of the P. B. A. needle valve and other constants of the controller).

It has been shown above that $R=S+K(Y-O)$. Furthermore both L and P are equal to the original value of R which may be called $R_0$. Therefore $$R=L+C(Y-O)+K(Y-O)=R_0+(C+K)(Y-O)$$

(where $(C+K)$ of course, is a constant) and $R-R_0=(C+K)(Y-O)$, but $R-R_0$ is the change in pressure R due to the deviation of the measured variable pressure from the control point pressure $(Y-O)$, and it has been shown that the change in valve pressure $(R-R_0)$ caused by the deviation is proportional to the deviation, this being the definition of proportional action.

Now assume the P. B. A. needle valve to be wide open so that there is practically no resistance at that point and, therefore, practically no pressure drop. In other words, the quantity of air escaping through the restriction between S and L will not equal the quantity flowing through the P. B. A. needle valve until S is practically equal to R. The effect of that is that for even a small deviation $(Y-O)$ S will continue to increase (and cause R to increase until R reaches its maximum value. Hence, when the P. B. A. needle valve is wide open the proportional band is very "narrow," which means that even a small deviation $(Y-O)$ will cause a large corrective movement of the control valve. The more the P. B. A. needle valve is closed, the "wider" the proportional band becomes, until when the valve is shut entirely, the deviation $(Y-O)$ will be balanced by a slight increase in R—just enough to counterbalance the downward force $(K(Y-O))$. A small increase in R will then balance quite a large $(Y-O)$ because the area against which the upward pressure of R is exerted is quite large compared to the difference in areas $(K)$. This is the condition which furnishes the maximum "width" of the proportional band, or, in other words, the minimum corrective action of the control valve (effluent valve) for a given deviation.

So far there has been considered only the proportional action of the controller. It has been shown above that when the proportional action only is working, there must be a deviation in order to hold the effluent control valve at any setting other than that at the start when the process was in equilibrium. Now, assume the condition (described above) when there is a deviation $(Y-O)$ and the process has become balanced with a new effluent valve position corresponding to $R=S=K(Y-O)$. Then open the reset rate adjustment (RRA) needle valve a small amount, allowing a flow from R to P. P will slowly increase (at a rate dependent on the size of the reset reference volume and upon the amount the RRA needle valve is open). As P increases, L will increase (because the restriction between B and L and the exhaust nozzle covered by the diaphragm between P and L constitute a pilot which keeps L balanced with P). As L increases, S will increase because of the open restriction between L and S. As set forth above, an increase in S causes an increase in R, which in turn tends to correct the process so Y is brought closer to equality with O. This action continues as long as R is greater than P, and equilibrium is reached when $R=S$, and $Y=O$. If a deviation $(Y-O)$ persists R will continue to increase and will continue to cause P (and therefore S) to increase until maximum R is reached. In the usual case, however, the effect is to increase R until the process is brought into balance with $Y=O$, so that the required valve setting for the new load condition is obtained without necessitating a deviation to keep the valve in the new position. That agrees with the definition of "Reset action."

All of the above discussion has been on the basis of an increase in the value of the Measured variable pressure Y. The same reasoning, however, applies in the case of a decrease in the value of Y. In that case, the unbalanced force lifts the pilot and allows some air to escape so G decreases. That allows the pilot diaphragm $D_6$ to lift and bleed air from the Effluent valve pressure R, reducing its value. The same reasoning as before will demonstrate similar "proportional" and "reset" action which, in this case, will reduce the valve pressure R in proportion to the deviation $(O-Y)$ and, if the deviation persists, will gradually reduce the valve pressure until O and Y are brought into agreement—or until R reaches its minimum.

SUMMARY OF THE FUNCTION OF THE ENTIRE CONTROL SYSTEM

There will now be described the total function of the control system, namely the chain of effects which result in the control effected by the controller unit 36 upon the liquid level, in response to an impulse from the pressure taps 29 and 30.

Assuming that due to some momentary disturbance a rise of liquid causes an increased tap pressure differential through the differential pressure transmitter unit 35, and proportionately increases the measured variable Y acting through pipe 62 upon chamber 152 within the controller unit 36.

In that case, due to the internal response of the controller unit 36 (as above described), that unit will cause a proportionate increase in controller pressure delivered by it through pipe 32 to the diaphragm 26 of the effluent valve. This effect will open the effluent valve further and sufficiently to allow the level in tank 13 to drop to normal. When the level has thus returned to normal and the disturbing influence has disappeared, that will also cause the valve to return to its former setting, namely the setting which it maintained prior to the occurrence of that disturbance.

If a sustained increase of tap pressure differential should occur, then the internal response of the controller unit 36 (due to its automatic resetting of the reference pressure P as above explained) will be such as to further increase the control pressure in line 32 until it has increased the effluent valve opening sufficiently to bring the liquid level in the tank back to normal.

Should there occur a drop of liquid level causing a decreased tap pressure differential, the chain of control effects will be similar although in reverse to those just described.

As for the general characteristic of the function of the system herein described, it should be understood that its functioning is not necessarily dependent upon having a controlled air pressure cushion above the liquid level in the tank, since the system is responsive to the differential between the tap pressures. That is to say, a corrective level controlling response will be carried out by the system irrespective of whether it is the pressure of the low pressure tap 30 and that of the high pressure tap 29 that varies. Hence this control system would also operate and execute corrective settings of the effluent valve 25 even if the tank were open and the liquid level exposed to atmospheric pressure.

What I claim is:

1. The combination of a liquid-treatment cell comprising a tank holding a bed of granular ion exchange material and having means for feeding liquid to the top portion of the bed for passage downwardly therethrough, and provided with a diaphragm-actuated effluent valve for controlling the discharge of liquid from the bottom portion of said bed while maintaining the bed submerged under a substantially constant pressure of gaseous medium above the liquid level in the tank, with a system for automatically controlling said effluent valve through relay air pressure applied thereto in a manner to maintain said liquid level substantially constant relative to the top level of the bed; characterized by said system comprising a high pressure tap communicating with the interior of the tank and immersed in said liquid and in said bed, a low pressure tap communicating with the interior of the tank above the liquid level, said pressure taps supplying auxiliary gaseous pressure medium below and above the liquid level respectively and representing tap pressures, a constant flow control device for each pressure tap for supplying said auxiliary pressure medium to said taps at a substantially constant rate, a differential pressure transmitting device adapted to receive the tap pressures and to emit a resultant pressure proportional to the differential of said tap pressures, a conduit leading from each pressure tap for transmitting tap pressure to said differential pressure-transmitting device, a controller adapted to receive said resultant pressure and to emit a proportionate relay air control pressure, conduit means for transmitting said resultant pressure to said controller, means for supplying relay air pressure to the controller, means for transmitting said relay air control pressure from the controller to said effluent valve to effect control thereof in proportion to fluctuation of the liquid level in the tank.

2. The combination according to claim 1, characterized by the fact that the tank is closed and that super-atmospheric pressure is maintained above the liquid level.

WALTER R. SWENSON.

REFERENCES CITED

The following references are of record in the file of this patent:

UNITED STATES PATENTS

| Number | Name | Date |
|---|---|---|
| 1,851,422 | Durando | Mar. 29, 1932 |
| 1,936,049 | De Mers et al. | Nov. 21, 1933 |
| 2,365,221 | Shafor | Dec. 19, 1944 |
| 2,409,768 | Lavett et al. | Oct. 22, 1946 |